Figure 1:
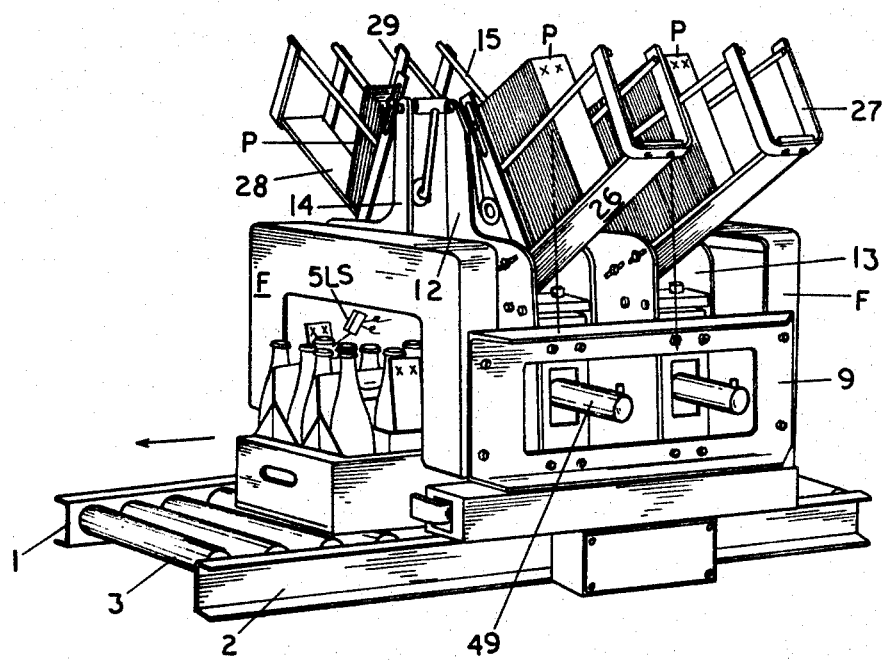

May 7, 1968 H. G. GENTRY ET AL 3,381,452
MACHINE FOR PLACING INSERTS INTO LOADED ARTICLE CARRIERS
Filed Dec. 22, 1965 3 Sheets-Sheet 1

INVENTOR.
HERMOND G. GENTRY
VICTOR BENATAR
JAMES T. FIDLER
BY Walter M. Rodgers
ATTORNEY INVENTOR.
HERMOND G. GENTRY
VICTOR BENATAR
JAMES T. FIDLER
BY Walter M. Rodgers
ATTORNEY INVENTOR.
HERMOND G. GENTRY
VICTOR BENATAR
JAMES T. FIDLER
BY Walter M. Rodgers
ATTORNEY United States Patent Office 3,381,452
Patented May 7, 1968

3,381,452
MACHINE FOR PLACING INSERTS INTO
LOADED ARTICLE CARRIERS
Hermond G. Gentry, Victor Benatar, and James T. Fidler, Atlanta, Ga., assignors to The Mead Corporation, a corporation of Ohio
Filed Dec. 22, 1965, Ser. No. 515,634
8 Claims. (Cl. 53—393)

This invention relates to a machine for placing inserts into loaded article carriers and more particularly to a machine which automatically responds to movement of an article carrier to arrest movement of the carrier and to adjust the relative positions of the carrier and machine for proper alignment and thereafter automatically to place an insert into a predetermined position within the carrier.

Article carriers of the type disclosed for example in U.S. Patent 2,537,452 frequently are positioned in tray-like containers sometimes called case packs. These case packs ordinarily are transported from place to place in the bottler's plant and elsewhere on suitable conveyors.

Frequently, it is desired to insert an advertising or other placard into a cell of an article carrier. Since article carrier cells usually are but slightly larger than the packaged articles therein and since it is ordinarily necessary to place the articles within the carrier cells before the inserts are placed in the carrier cell, it is essential that proper alignment be achieved. Furthermore, it is ordinarily necessary to bend the insert so as to cause it to conform, at least to some extent, with the exterior surface of the packaged article. Thus, a high degree of precision is required when placing inserts into loaded article carriers. Heretofore, it has been the practice to place such inserts by hand, mainly because there has been no available automatic machine for so doing. Of course, hand insertion of advertising materials is both time consuming and expensive.

A principal object of this invention is to provide a machine for high speed, automatic placement of inserts into article carriers and the like.

Another object of this invention is the provision of an automatic inserting machine for use in conjunction with loaded article carriers wherein a minimum of maintenance and service as well as operating attention is required.

Still another object of the invention is to provide an article inserting machine of the type described wherein one or more inserts may be placed simultaneously into one or more corresponding article carriers.

A machine constructed according to this invention for placing an insert into a cell of an article carrier and adjacent to an article therein may comprise a fixed frame structure on which is positioned a movably mounted yoke, inserting means mounted on the yoke and operable to impart movement to an insert from a position on the yoke into the carrier cell and adjacent to an article therein and an article engaging element mounted on the yoke and movable relative thereto from a withdrawn position to an article engaging position, the article engaging element being movable along a predetermined path relative to the yoke and in the general direction of the cell and of the article therein, the article engaging element being configured so as to engage the article in the cell and to cause the yoke and the article engaging element to shift transversely relative to the path of movement of the article engaging element so as to bring the article engaging element into accurate alignment with the packaged item and the associated cell if the article and cell do not occupy positions of precise alignment therewith. According to a feature of the invention, a suitable guide element is mounted on the yoke and adjacent to the article engaging element and is configured so as partially to envelope the article and simultaneously to impart a degree of bend to the insert during the inserting operation. According to another feature of the invention, means are provided for automatically arresting movement of the article carrier in a predetermined desired position on a suitable incoming conveyor bringing the article carrier toward the machine, the entire operation being actuated by a suitable actuating device mounted on the machine and in the path of movement of the carrier.

Figure 2:
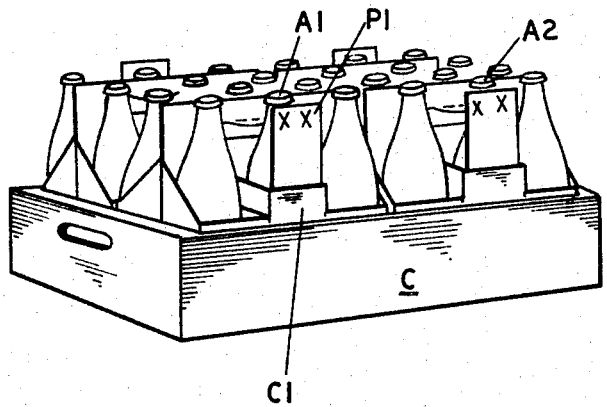
Figures 3, 4, 4A:
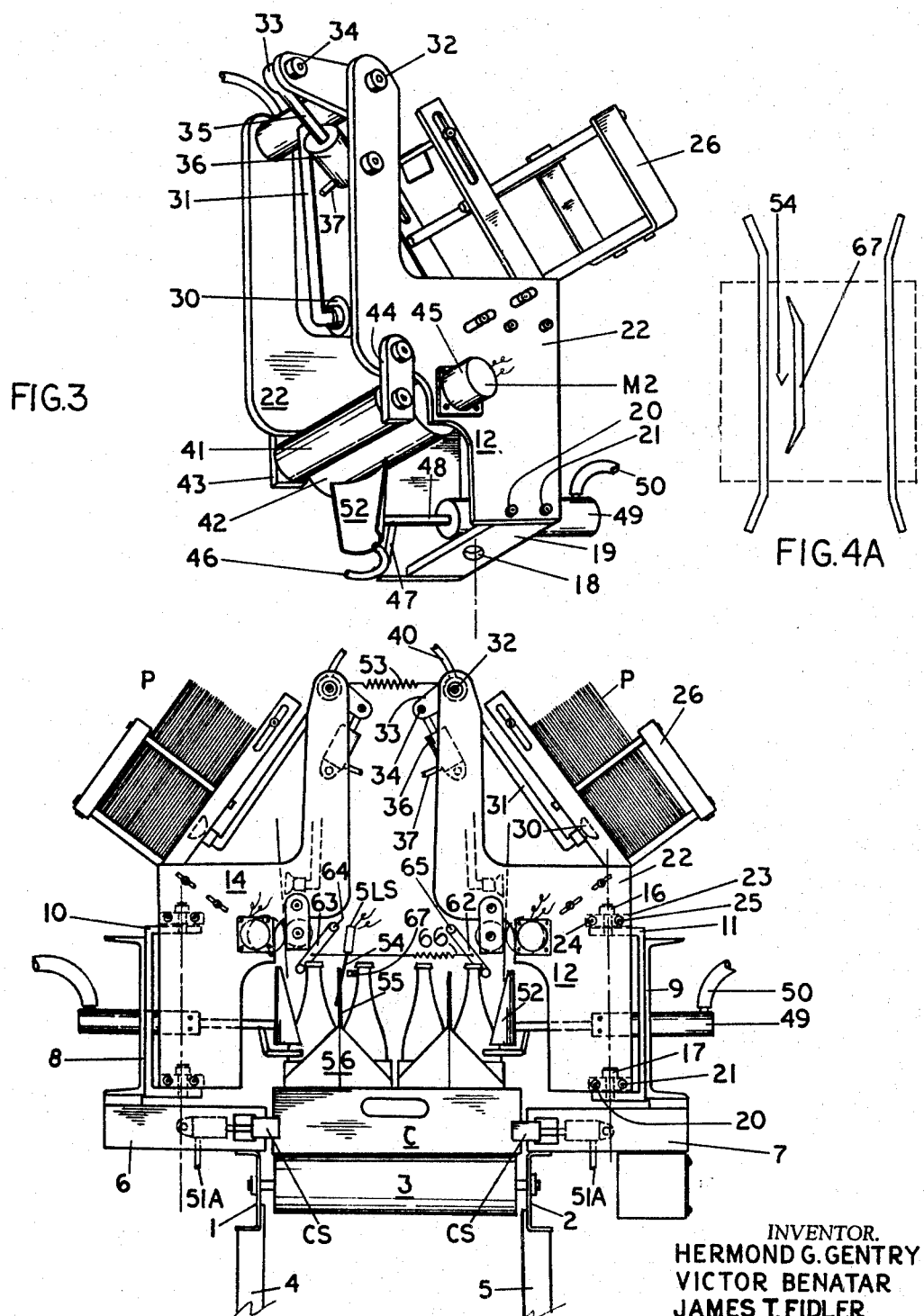
Figure 5:
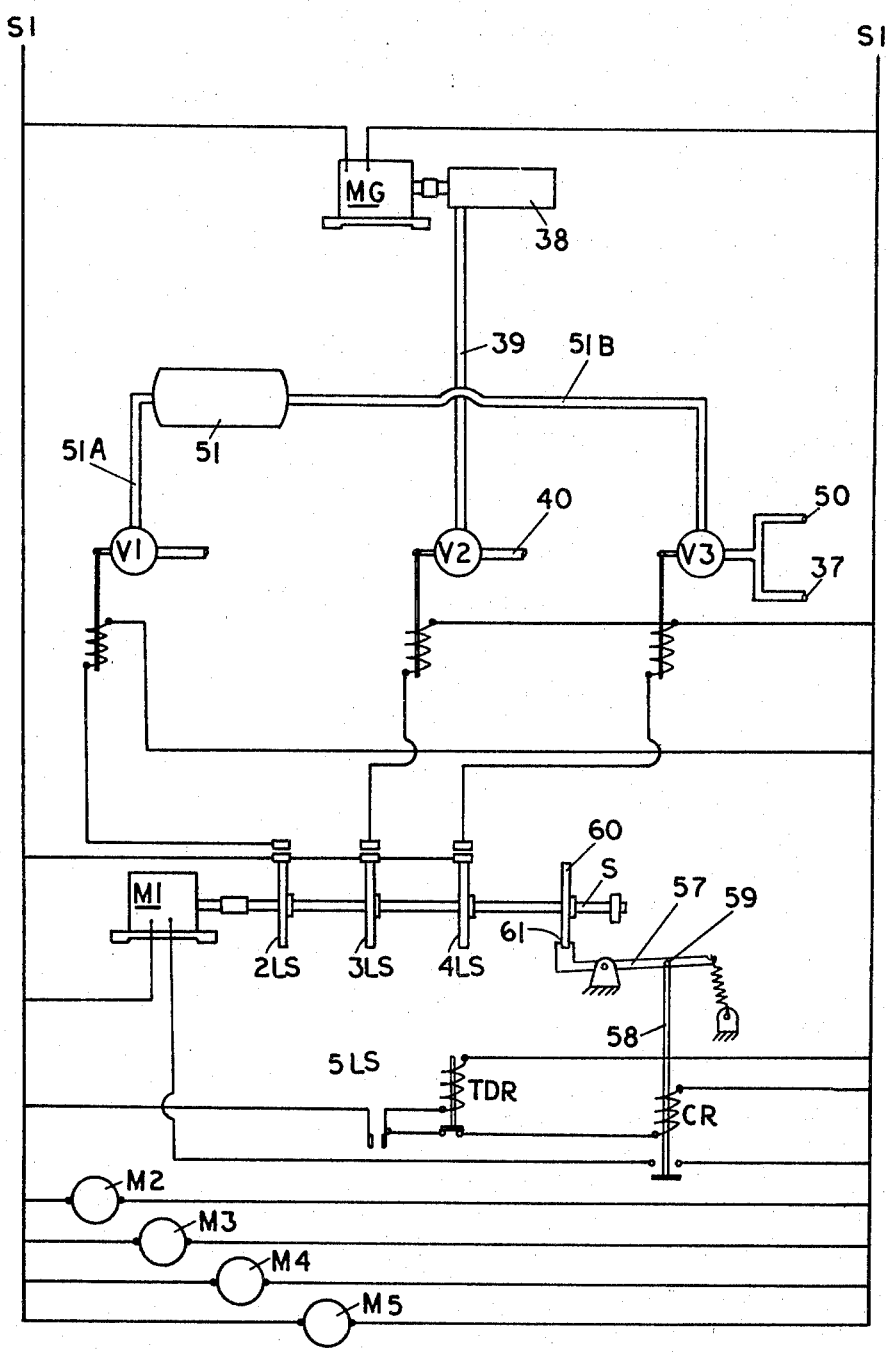

For a better understanding of the invention, reference may be had to the following detailed description taken in conjunction with the accompanying drawings in which FIG. 1 is a perspective view of a machine constructed according to the invention; FIG. 2 is a perspective view of a case pack in which four identical article carriers are packaged and for which the version of the invention depicted in FIG. 1 is specially adapted; FIG. 3 is a perspective view of one of the four yoke elements incorporated in the machine depicted in FIG. 1; FIG. 4 is an end view of the machine depicted in FIG. 1 as seen from the discharge end of the machine; FIG. 4A is a plan view of a tilting guide system constructed according to a feature of the invention; and in which FIG. 5 is a schematic control diagram depicting the various control elements whereby the machine is actuated automatically.

In the drawings, the numerals 1 and 2 are used to designate a pair of oppositely disposed channels which form elements of a conveyor system having a plurality of rollers rotatably mounted thereon and designated by the numeral 3. Channels 1 and 2 are mounted on a suitable base designated respectively by the numerals 4 and 5. Mounted on the channels 1 and 2 are suitable support elements 6 and 7 to which are secured the channels 8 and 9, respectively, as by welding or by other suitable means. End frame pieces F are secured to each end of channels 8 and 9. Secured in back-to-back relation to the channels 8 and 9 are a pair of channel supports 10 and 11, respectively. These channel supports may be welded or otherwise secured to the channels 8 and 9 respectively. The elements 6–11 in effect constitute a supporting frame mounted on the conveyor channels 1 and 2.

As the article carriers packed within the case C approach the machine on conveyor rollers 3 their movement according to a feature of this invention is arrested at a predetermined desired position and the inserts are then automatically placed into a predetermined cell of one or more article carriers.

For the purpose of arresting the movement of the case C, suitable fluid motors designated in the drawings by the designation CS are provided and are of conventional construction, such case stoppers being actuated by fluid from reservoir 51 supplied through conduits 51A. Of course, the fluid motors CS are actuated at the proper time by the control system depicted in FIG. 5.

Since the article carriers and the articles may be of different sizes and because of other variables too numerous to mention, it is necessary to provide for an accommodation of misalignment. In accordance with this invention, certain machine elements are mounted in a movable fashion on the frame of the machine. Each yoke structure for placing each insert according to this invention is pivotally mounted about vertically aligned pivots so that each article carrier is disposed immediately below the yoke which corresponds thereto. For example, and as shown in the drawings, the machine of FIG. 1 is provided with four yokes designated by the numerals 12, 13, 14 and 15, only the hopper structure of the yoke 15 being visible in FIG. 1.

As is best shown in FIG. 4, channel frame 11 is provided with a pair of pivot pins 16 and 17. Pivot pin 17 in assembled position is disposed within the aperture 18 formed in the cross plate 19 secured by bolts or screws 20 and 21 to the side plates 22 of yoke 12. In like fashion, pivot pin 16 is disposed within an opening not shown clearly in the drawings but which is formed in the cross plate 23 secured by bolts 24 and 25 to the side plates 22 of the yoke 12. Thus, the pivots 16 and 17 constitute pivotal mountings for the yoke 12 whereby the yoke may swing to and fro in a horizontal plane. Thus, slight misalignment in the positioning of the case C and of its associated carriers and packaged articles may be accommodated by the yoke 12. The yokes 13, 14 and 15 are constructed and function in a manner identical to yoke 12 and a detailed description thereof is therefore not deemed necessary.

For the purpose of storing the inserts, each yoke is provided with a hopper structure designated in the drawings by the numerals 26, 27, 28 and 29. A supply of inserts or placards P is furnished for each hopper.

In order to withdraw an insert or placard from the hopper 26, a suitable suction cup 30 is affixed to a rod 31 which is pivotally mounted at 32 on the yoke 12. Fixedly connected with the arm 31 is a crank 33 which is pivotally connected at 34 with a fluid motor 36. Fluid motor 36 is operated by a source of pressure fluid supplied through flexible tube 37.

The suction cup 30 grips the lowermost insert or placard P by suction action supplied from a vacuum source designated by the numeral 38 through conduits 39 and 40 and control valve V2.

Thus, when a particular case C is in a proper position and in turn a certain article A is disposed underneath the yoke 12, an insert P is withdrawn due to actuation of fluid motor 36 causing the arm 31 and the suction cup 30 to swing in a clockwise direction about the pivot 32 as viewed in FIG. 4 to withdraw the lowermost insert P. Vacuum acting through the tube 40 from the source 38 has previously been applied and has caused the suction cup 30 to grip the insert P. With the insert disposed above the rollers 41 and 42, the vacuum is released and the inserting means in the form of cooperating rollers 41 and 42 receive the insert therebetween. As is apparent from FIG. 3, roller 41 is free rolling and is simply supported from plates 22 by a pair of downwardly extending support plates 43 and 44. Roller 42 is also rotatably mounted on the yoke plates 22 and motivating effort is supplied by electrically operated motor 45. In this manner an insert is supplied from the hopper 26 toward the article carriers mounted in the case C.

Since the alignment of the yoke 12 must be insured relative to a particular cell of a particular article carrier, an article engaging element is provided in accordance with a feature of this invention. This article engaging element is designated in the drawings by the numeral 46 and comprises a bifurcated plate as is best shown in FIG. 3. Plate 46 is mounted by a support element 47 secured to plunger 48 which in turn is actuated to and fro by a fluid motor 49 supplied with pressure fluid through tubes 50 and 51B from a source of pressure fluid designated in the drawings by the numeral 51 and controlled by valve V3. Since the fluid motor 49 is rigidly affixed to the yoke 12 by suitable means, the article engaging element 46 together with the plunger 48 and the support element 47 move in a predetermined straight path of movement relative to yoke 12. Thus, as the bifurcated end of the article engaging element 46 moves into engagement with an article such as article A1 in case C, the inwardly sloping notched portion of the bifurcation causes the yoke 12 to shift slightly in a horizontal plane if the particular article A1 is not in proper alignment with the yoke 12. Of course, if the article A1 happens to be in the correct position, no swinging movement of yoke 12 will take place. Thus, the yoke 12 is appropriately positioned with respect to the particular article A1 and its associated receptacle.

Having appropriately aligned the yoke 12 with respect to the article A1 and its associated cell, it is then only necessary to feed the insert XX into the cell by properly actuating the paper feed suction mechanism 30 and associated parts followed by proper actuation of inserting means 41, 42.

Since the inserts XX are approximately the size of the receptacles into which they are inserted, it is desirable to bend the inserts about a vertical axis during the inserting operation and in this manner to narrow the width thereof so as to render unnecessary an absolutely precise alignment of the parts of the machine and of the carriers into which the inserts are being placed. Thus, and in accordance with a feature of the invention, a guide element 52 is mounted on the plunger 48 and immediately above and adjacent to the article engaging element 46. Thus, as a placard XX is inserted downwardly between the inserting rolls 41 and 42, a degree of curvature is imparted thereto by the guide element 52. The rigidity of the insert is increased by the curved configuration and the insert is thus adapted for full insertion without bending vertically. Since the proper alignment has already been achieved due to the action of article engaging element 46, the placard XX is inserted positively into the cell of the carrier and alongside the article A1 packaged therein. Since the guide element 52 is mounted on plunger 48, the guide 52 is movable with the yoke 12 and the article engaging element 46. In this manner automatic accommodation of bottles of different locations is automatic.

In order to stabilize the structure and at the same time to provide a measure of flexibility thereto, it is preferable to interconnect oppositely disposed yokes such for example as 12 and 14 by a tension spring shown in FIG. 4 designated by the numeral 53.

Initiation of the inserting operation is effected by the micro-switch shown in FIGS. 1 and 4 and designated 5LS. This switch is provided with an actuating arm 54 which is engaged by the handle structure 55 of carrier 56 mounted in case C. It will be understood that each yoke member such as 12, 13, 14 and 15 is controlled by a micro-switch such as designated at 5LS in FIG. 4.

As is depicted in FIG. 5, the control system is energized from a source of electric power controlled by the master switch designated schematically at S1. The vacuum pump designated by the numeral 38 is energized by an electric motor MG which is energized upon closing of the master switch S1.

The motors M2, M3, M4 and M5 are continuously energized upon closing of the master switch S1 and these small motors serve to operate the insertion rollers such as 41 and 42 and in FIG. 3 one such motor M2 is designated by the numeral 45.

An inserting operation is initiated when a case mounted on the conveyor 1, 2, 3 arrives in the general position depicted in FIG. 1. At this point handle portion 55 of carrier 56 mounted in case C engages the switch 5LS which action in turn energizes the coil of a control relay CR. This circuit is completed through the normally closed contacts of a time delay relay TDR. Actuation of the coil of relay CR causes its armature to rise and closes its normally open contacts thereby to energize the motor M1 to initiate rotation of shaft S. Shaft S is normally held in a fixed position by the control arm 57 which is pivoted to the armature 58 of relay CR at pivot 59 and by a cam 60 on shaft S having a notch 61 into which control arm 57 rests. Energization of relay CR elevates armature 58 and swings control arm 57 out of the locking notch 61 and frees shaft S which rotates since motor M1 is energized.

Mounted on the shaft S are three cam operated switches designated 2LS, 3LS and 4LS. Thus, when the switch 2LS is closed the solenoid valve V1 is actuated to the open position and fluid pressure from reservoir 51 is supplied through valve V1 and conduit 51A to the case stopper devices CS and the movement of case C is arrested. Continued rotation of shaft S then closes switch 3LS which energizes solenoid actuated valve V2. This operation supplies vacuum pressure through conduits 39, valve V2 and conduits 40 to the suction cup 30 through operating arm 31. Shortly thereafter, limit switch 4LS is closed due to continued rotation of shaft S and this action actuates valve V3 to the open position and simultaneously supplies fluid pressure through conduit 51B, 37 and 50 to fluid motor 36 and thereby to actuate the insert feeder arm 31. An insert P is thus withdrawn from the hopper 26 and lowered into position immediately above the rolls 41 and 42. Simultaneously, fluid motor 49 is actuated by pressure fluid supplied thereto through conduit 50. The article engaging element 46 is moved toward the left and envelopes article A1. This action shifts the yoke 12 about the pivots 16 and 17 if the bottle A1 is slightly out of alignment. A placard or insert is fed downwardly by the rolls 41, 42 and engages the guide 52 which is disposed immediately adjacent the article A1. The insert XX thus is curved about a vertical center line and slips in between a bottle A1 and the outer portion of the cell C1 to occupy the position depicted at P1 in FIG. 2.

Upon completion of the inserting operation, the shaft S will have completed one revolution and the control arm 57 thus falls back into the notch 61 formed in disc 60 due to the action of spring 60 where the cycle is ready for a repetition upon engagement of the switch 5LS by a succeeding handle such as 55 in a succeeding case such as C. The time delay relay TDR deenergizes the relay coil CR after a fraction of a second so that the notch 61 is engaged by the latch 57 after one revolution of the shaft S.

While the above description is limited generally to the yoke 12, it will be understood that it is applicable equally to yokes 13, 14 and 15. Each yoke is complete in itself and all yokes are controlled by the same control system such as is shown in FIG. 5. Of course, it will be understood that the same reservoir such as 51 and the same vacuum source such as 38 could be used to actuate all of the yoke elements and their associated systems.

For the purpose of facilitating placement of the inserts, a bottle such as A1 is tilted away from the side wall of the carrier such as C1, a tilting guide is provided. A pair of such guides are shown in FIG. 4 and are designated by the numerals 62 and 63. These guides are pivoted at 64 and 65 respectively and are biased toward each other by spring 66 and are configured so that engagement between bottle A1 and a guide such as 62 or 63 performs the desired tilting operation and thereby affords space between the bottle A1 and the side wall of the carton such as C1 for receiving the insert.

In order to insure that the handle of the carrier is freely accessible for engagement by the switch arm 54, a bottle guide 67 is provided which ploughs any bottle which is too close to the handle in a direction away from the handle and toward the carrier side wall.

It will be understood that one, two, three or four yokes may be used as is desired and if additional yokes are needed for a particular installation, additional yokes may be added in accordance with this invention.

While a particular embodiment of the invention has been shown and described, it will be understood that the invention is not limited thereto, and it is intended in the appended claims to cover all such changes and modifications as fall within the true spirit and scope of the invention.

The embodiments of the invention in which an exclusive property or privilege is claimed are defined as follows:

1. A machine for placing an insert into a receptacle and adjacent to an article therein, said machine comprising a movably mounted yoke, inserting means mounted on said yoke and operable to impart movement to an insert from a position on said yoke into the carrier cell and adjacent an article therein, and an article engaging element mounted on said yoke and movable relative to said yoke from a withdrawn position to an article engaging position, said article engaging element being movable along a predetermined path relative to said yoke and generally toward the article and cell of the carrier and having an article engaging part which is configured to engage the article in the cell of the carrier and to cause said yoke and said article engaging element to shift to positions wherein the article is accurately aligned with the path of movement of said article engaging element if the article and cell are not in positions of accurate alignment therewith.

2. A machine according to claim 1 wherein said inserting means is aligned with the path of movement of said article engaging means and with the article upon completion of movement of said article engaging element toward its article engaging position.

3. A machine according to claim 1 wherein guide means is movable with said article engaging means and arranged to guide the movement of the insert into the article carrier cell and adjacent the article therein.

4. A machine according to claim 3 wherein said guide means is configured so that its interior surface is in general conformity with and generally concentric to the exterior of the article adjacent which the insert is placed when said guide means is in its insert guiding position.

5. A machine according to claim 1 wherein a conveyor transports the article carrier into and out of cooperative relation with said article engaging element and wherein the article carrier is held in fixed position during an inserting operation by automatic stop means engageable therewith in response to the presence of the carrier adjacent the machine.

6. A machine according to claim 5 wherein actuating means is mounted in the path of movement of the carrier on said conveyor and effective to initiate operation of said article engaging element and of said inserting means.

7. A machine according to claim 1 wherein said article engaging part is of bifurcated configuration and wherein the path of movement of said article engaging element is aligned with the bisector of the angle defined by the bifurcated configuration of said article engaging part.

8. A machine according to claim 1 wherein a tilting guide is disposed for engagement by the article and is effective to tilt the article in a direction away from one side of the receptacle thereby to provide space for receiving the insert.

References Cited

UNITED STATES PATENTS 2,795,906   6/1957   Harker _____ 53—157 X
3,350,836   11/1967  Dillon et al. _____ 53—157 X WILLIAM W. DYER, JR., *Primary Examiner.*

NEIL ABRAMS, *Assistant Examiner.*